United States Patent
Szonn et al.

(10) Patent No.: US 6,331,336 B1
(45) Date of Patent: *Dec. 18, 2001

(54) MULTILAYER ADHESIVE TAPE

(75) Inventors: Bodo Szonn, Kisdorf; Werner Kluge-Paletta, Buchholz, both of (DE)

(73) Assignee: Beiersdorf AG, Hamburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,659

(22) Filed: Apr. 21, 1998

(30) Foreign Application Priority Data

Apr. 23, 1997 (DE) ................................. 197 16 995

(51) Int. Cl.⁷ .............................. B32B 25/08; B32B 27/22
(52) U.S. Cl. ................... 428/40.1; 428/41.3; 428/41.5; 428/41.7; 428/353; 428/354
(58) Field of Search .................... 428/40.1, 41.3, 428/41.5, 41.7, 353, 354

(56) References Cited

FOREIGN PATENT DOCUMENTS

| | | |
|---|---|---|
| 2116558 | 10/1972 | (DE) . |
| 2455133 | 5/1976 | (DE) . |
| 0494619A2 | 7/1992 | (EP) . |
| 1375876 | 11/1994 | (GB) . |

OTHER PUBLICATIONS

Römpp Chemie Lexikon, pp. 3513–3514 plus cover page (1992).

*Primary Examiner*—Nasser Ahmad
(74) *Attorney, Agent, or Firm*—Norris McLaughlin & Marcus

(57) ABSTRACT

Single- or double-sidedly self-adhesively treated adhesive tape having an elastomeric backing layer, characterized in that a) the backing layer consists essentially of a styrene-butadiene copolymer,
b) a self-adhesive composition is applied to one or both sides of the backing layer, and between backing layer and self-adhesive composition
c) there is an interlayer comprising polyphenylene ether.

11 Claims, No Drawings

MULTILAYER ADHESIVE TAPE

The invention relates to a self-adhesively coated adhesive tape having an elastomeric backing layer and an interlayer between backing layer and adhesive coating, and to processes for producing such an adhesive tape.

The use of interlayers between the actual backing layer and the adhesive coating is known. One of the purposes of these interlayers is to prevent or lessen the migration of constituents with which the backing layer may have been blended from the backing layer into the adhesive. Migration of this kind may lead to structural alterations in the adhesive layer and/or to deposits on the surface of the adhesive and hence to a reduction in the bonding strength. A further function of the interlayers is to smooth out uneven backing surfaces to that the adhesive layer which is to be laminated to it, and which is capable of more or less rubber-elastic deformation, is presented with an optimum bond surface at the time of lamination.

When the adhesive tape has been stuck on, interlayers—especially if they are energy-elastically deformable—may have the function of absorbing stress peaks greater than the average force acting on the bond area and of distributing such peak stresses over the area of the bond in order thereby to counter fracture of the bond.

Finally, interlayers are used as a primer between backing and adhesive if these two latter components adhere poorly to one another owing to their greatly differing polarities.

The use of thin polyamide layers, for example, is known for this purpose.

A disadvantage of the conventional interlayers is often that they fulfill the barrier, the smoothing and the force-absorbing function but are at the same time of inadequate adhesion to the underlying backing. At relatively high stress levels there is then a possibility that the adhesive tape might suffer delamination, instances of which may lead to complete failure of the adhesive bond.

The object of the invention, therefore, was to provide an adhesive tape which, with an elastomeric backing layer, has an interlayer anchored securely on the backing layer.

To achieve this object the invention proposes an adhesive tape which is equipped with a self-adhesive coating on one or both sides and has an elastomeric backing layer wherein the elastomer consists essentiallly of a styrene-butadiene copolymer.

Applied to one or both sides of the backing layer is a self-adhesive composition, with an interlayer of polyphenylene ether between backing layer and self-adhesive composition.

In a preferred embodiment the polyphenylene ether is poly(oxy-2,6-dimethyl-p-phenylene), it being possible for the latter to have been flexibilized by blending advantageously with minor amounts of polystyrene, polyamide or a styrene-acrylonitrile copolymer. For the same purpose it is also possible to mix the polyphenylene ether with a block copolymer based on SEBS.

The interlayer here can be prepared by extrusion with or without an auxiliary backing, and in a thickness of from 5 $\mu$m to 40 $\mu$m, in particular 8 $\mu$m.

Alternatively, the interlayer can be prepared from solution on an auxiliary backing.

Where an auxiliary backing is used, the interlayer can be peeled off again from this backing without restriction.

The styrene content in the overall composition of the backing layer is preferably at least 12% by weight.

Advantageously, the styrene-butadiene copolymer of the backing layer can be a random copolymer, prepared from solution or by emulsion polymerization, with a styrene fraction of at least 23% by weight.

The styrene-butadiene copolymer used for the backing layer can be crosslinkable physically—for example, by crosslinking using electron beams—or chemically.

To increase the durability of the adhesive tape it can be filled with customary anti-ageing agents, which depending on the particular application may originate from the class of the discoloring of non-discoloring anti-ageing agents, especially in the range from 0 to 10 phr, and also with known light stabilizers or ozone protectants. Also possible is blending with vulcanizing agents (such as, for example, peroxides or sulphur, sulphur donors or accelerators) and/or the addition of fatty acid, especially in the range from 0 to 10 phr, and the use of plasticizers.

In order to establish specifically the desired properties of the backing it is possible if desired to use additional fillers. For instance, the styrene-butadiene copolymer can be admixed with reinforcing, semi-reinforcing or non-reinforcing carbon blacks, in particular at from 0 to 50 phr, with zinc oxide, in particular at from 0 to 50 phr, and/or with other fillers, such as silica, silicates, or chalk. Fillers other than those mentioned can also be used. It is additionally possible to add resins from the class of the phenolic and/or hydrocarbon resins, in the range, in particular of from 0 to 50 phr.

Depending on the intended use of the self-adhesive tape, all of these additives referred to can be employed either alone or in any desired combination with one another for preparing the styrene-butadiene copolymer in order to obtain optimum tailoring to the utility.

Through the use of these additives it is also readily possible to provide the black coloration of the backing as is generally required by the industry.

The backing layer has a thickness of from 400 $\mu$m to 3000 $\mu$m, in particular from 500 $\mu$m to 1400 $\mu$m.

As a filler for modifying the properties of the backing it is possible to add solid microbeads to the backing formulation, in a volume proportion of from 1 to 50%, in particular from 10 to 30%, by volume. The solid microbeads present in the backing formulation bring about particularly advantageous properties of the self-adhesive tape of the invention if the solid microbeads are solid glass microbeads having a diameter of from 1 $\mu$m to 100 $\mu$m, in particular from 10 $\mu$m to 60 $\mu$m.

The backing mixture is preferably prepared in an internal mixer of the kind typical for elastomer compounding. In this case the styrene-butadiene copolymer is adjusted in particular to a Mooney value $ML_{1+3}$ (100° C.) in the range from 40 to 80. Processing takes place preferably without solvent. The desired fillers may be added to the styrene-butadiene copolymer at the same time. The styrene-butadiene copolymer can subsequently be extruded or calendered to the desired thickness on customary commercial machines. This gives a backing layer thickness that is within the ranges set out above.

Express reference is made here to the known technology of processing styrene-butadiene copolymers and to the known additives employed for this purpose, in accordance, for instance, with the book by Werner Kleemann (Werner Kleemann: "Mischungen für die Elastverarbeitung", Deutscher Verlag für Grundstoffindustrie, Leipzig 1982).

Following the application of the interlayer and the elapsement of a certain waiting period within which the necessary diffusion takes place, the backing can be crosslinked by means of electron beams or by means of known chemical crosslinkers.

An alternative option is to laminate the polyphenlene ether-based interlayer onto the backing at temperatures higher than 120° C., using a calender, and to carry out in-line crosslinking of the backing immediately thereafter.

The thermodynamic state of the backing prior to contact with the interlayer allows the molecules and/or molecular segments the mobility required for diffusion. Preferably, the backing is not crosslinked until after the diffusion process has taken place.

The pressure-sensitive self-adhesive composition preferably includes known copolymers of methyl acrylate with 2-ethylhexyl acrylate and acrylic acid, preferably with a composition of from 20 to 40% by weight methyl acrylate, from 20 to 70% by weight 2-ethylhexyl acrylate and from 0 to 10% by weight acrylic acid.

It is possible to add further known components in order to obtain certain properties: crosslinkers, tackifier resins and anti-ageing agents are added in particular.

The self-adhesive composition can be applied directly from the solution, dispersion or melt or can be applied by the transfer method or by coextrusion with the backing and the interlayer. In the case of coextrusion in particular it is advantageous to carry out in-line crosslinking of backing and adhesive composition by electron beam curing. The applied weight of the adhesive composition can be chosen arbitrarily, likewise in dependence on the intended use, within the range from 10 $g/m^2$ to 250 $g/m^2$, preferably from 40 $g/m^2$ to 150 $g/m^2$.

The self-adhesive coating has a thickness of from 30 $\mu$m to 100 $\mu$m, in particular 50 $\mu$m.

The affinity of the self-adhesive composition is sufficient to ensure that the adhesion to the polyphenylene ether of the interlayer is sufficient to meet the requirements.

Furthermore, one or both self-adhesive coatings can be covered with a release paper, preferably with a double-sidedly antiadhesively coated masking paper or with a polyolefin-based film. The film can have been antiadhesively treated on both sides.

Also embraced by the concept of the invention are processes for producing an adhesive tape of the invention. In one preferred production process the backing layer, one or both interlayers and one or both coats of the self-adhesive composition are brought together by a laminating process, especially a cold laminating process.

In a second preferred process, the backing layer is first of all shaped and applied by a calendering process onto the ready-formed interlayer which is in turn supported by an auxiliary backing. The other side of the backing layer is then covered if desired with a second interlayer, including auxiliary backing, or, in the case of an auxiliary backing provided on both sides with an interlayer, is joined with the second interlayer on the other side while the laminate is being wound up into a roll. In the next step of the process the auxiliary backing or backings is or are peeled off, and finally a self-adhesive coating is applied to one or both interlayers.

Since the interlayer is formed on the mirror-smooth surface of an auxiliary backing, the side of the interlayer that is opposite the backing likewise possesses a mirror-smooth surface, in the manner of a negative impression of the surface of the auxiliary backing, and offers an optimum bond area to the adhesive composition applied by the transfer method.

The polyphenylene ether-based interlayer has a glass transition temperature of approximately 200° C. and hence is in the energy-elastic range at the application temperature and contributes to the dissipation of stress peaks in the course of bonding.

It has been found that the polyphenylene ether interlayer is very suitable for acting as a barrier to constituents migrating from the elastomeric backing layer into the self-adhesive coating.

It is known from the theory of autoadhesion that two solids of the same composition and hence the same cohesive energy combine spontaneously with one another by diffusion, and in doing so give up their interface, if they contact one another within the reach of the van der Waal's forces and if there is sufficient mobility of their molecular segments as a result of micro-Brownian motions. Micro-Brownian motions are produced if a macromolecular substance is heated to above the glass transition temperature, i.e. is in the rubber-elastic of elastomeric state. With a view to the diffusibility of a macromolecular substance, however, the crosslinking sites required for the existence of rubber-elasticity must not be chemical in nature but need instead to exist as the result of thermally reversibly inititable "dynamic adhesion points" as a consequence of the entanglement of the macromolecules, or to come about through intermolecular forces.

Diffusion also occurs when two different but mutually soluble substances contact one another under the conditions described and if at least one of the two substances is in the elastomeric state. The outstanding compatibility of styrene-containing polymers with polyphenylene either leads to a spontaneous, temperature- and time-dependent interdiffusion when the two substances come into contact.

Polymer-polymer interdiffusion at the interface between polyphenylene ether and styrene-containing polymers has been investigated at great length by Hüls, for instance, and has been entered practice in the form of the designation "plastic-rubber bond".

The present invention describes the construction and the process for producing a self-adhesive tape utilizing this effect. The self-adhesive tape backing of the invention is predominantly comprised of a styrene-butadiene copolymer and the interlayer of the invention is predominantly comprised of a polyphenylene ether. Joining the two firmly by dry lamination of contacted layers is achieved essentially by a process of diffusion, in which styrene-containing molecular segments diffuse from the elastomeric backing, which has a glass transition temperature of −65° C., into the layer comprising the glassy polyphenylene ether, with a glass transition temperature of approximately 200° C.

In the course of storage of the finished backing layer/interlayer laminate, the diffusion can be accelerated by elevated temperature but takes place even at room temperature. Periods of time which have been found optimum for the diffusion are those lying within the time window between 24 hours and 240 hours. Alternatively, it is also possible to laminate the polyphenylene ether-based interlayer to the backing at temperatures higher than 120° C. so that the process of diffusion takes place largely in-line.

The properties set out above ensure that no delamination of the adhesive tape occurs even under high stresses.

In the text below the invention will be elucidated further by means of a number of examples, without wishing thereby to restrict the invention unnecessarily.

EXAMPLES

Example 1

A backing layer with the composition indicated in Table 1 was prepared in an internal mixer under the conditions common in the rubber industry.

TABLE 1

Composition of the backing layer

|  | Parts by weight |
|---|---|
| Random styrene-butadiene copolymer with 23.5% by weight styrene | 66 |
| Chalk | 26 |
| Carbon black | 6.5 |
| Anti-ageing agent | 1.5 |

The mixture was shaped and applied by means of a calender to an auxiliary backing coated on both sides with the interlayer, and this assembly was wound up into a roll so that the reverse side of the backing comes into contact with the interlayer that was facing away from the backing during its shaping. The auxiliary backing employed was a 25–50 μm thick polyethylene terephthalate film. In the course of storage in roll form, the diffusion between backing and interlayer took place over a period of 48 hours on both sides of the laminate.

In order to obtain a backing provided on only one side with an interlayer, a polyethylene terephthalate film was employed which had been coated on only one side with the interlayer and which, if it had been necessary to wind the film up into a roll, had been treated on the other side with an antiadhesive coating.

It was also possible to shape the backing and apply it to an auxiliary backing devoid of an interlayer, and then to provide this assembly on one or both sides with an interlayer. It was possible for the auxiliary backing to have been given an antiadhesive coating in order to facilitate the removal of the backing.

In every case, the removal of the auxiliary backings from the interlayer was not carried out until the diffusion process had taken place between backing and interlayer.

This could be carried out in-line directly after the lamination of the interlayer if the laminating process was carried out at temperatures higher than 120° C. It could also be performed in separate operations if room-temperature lamination dictated the need for a storage period in order to allow the diffusion to take place.

The interlayer was prepared from Vestoran 800 ® from Hüls. For this purpose the polyphenylene ether solution, prepared under reflux in toluene, was applied to a polyester film in a coating thickness of 4 μm and was dried. In a further experimental series the coating thickness was 8 μm.

The self-adhesive composition used was a copolymer of methyl acrylate with 2-ethylhexyl acrylate and acrylic acid that had been crosslinked at a temperature upwards of 100° C. with 0.5% of an acetylacetone-based internal complex formed with titanium.

The copolymer described has the following composition:
30% by weight methyl acrylate
60% by weight 2-ethylhexyl acrylate
10% by weight acrylic acid The self-adhesive composition was applied in a dry-film thickness of 50 μm to an antiadhesively treated auxiliary backing and was dried. In order to produce the adhesive tape of the invention, the dried self-adhesive composition was laminated cold by the transfer method onto the interlayer exposed when the backing was unrolled, after the auxiliary backing for the interlayer had been removed. The laminated product was subjected to electron beam crosslinking at 80 kGy and was wound up into a roll together with the auxiliary backing for the adhesive.

The same process was repeated for treating the second interlayer of the backing with adhesive. In this case, the auxiliary backing for the first adhesive coat was removed and that for the second adhesive coat was left in the laminated product.

It was also possible to carry out electron beam crosslinking prior to the coating with adhesive, if higher bond strengths were required for the use of the product and if a lower level of cohesion of the adhesive was not disadvantageous. It was also possible to produce a laminate comprising backing, interlayer and adhesive, to store this laminate initially and to crosslink it with electron beams at a later point in time.

Yet another possibility was to laminate all of the layers of the product with one another in-line by means of a plurality of laminating stations at temperatures higher than 120° C. and to carry out in-line crosslinking of the resulting laminate with electron beams.

Example 2

A backing layer with the same composition as that indicated in Example 1 was applied in a layer thickness of 0.5 mm, using a calender, to an auxiliary backing of antiadhesively coated polypropylene.

The interlayer used was Vestoran 1900® from Hüls, a polystyrene-modified polyphenylene ether. An extruder with a slot die was used to produce a film of the Vestoran 1900 ® having a layer thickness of 30 μm.

The self-adhesive composition used was a resin/rubber mixture of the following composition:
45% by weight of a triblock polymer based on styrene-butadiene-styrene
15% by weight of a synthetic hydrocarbon resin with a melting point of 125° C.
10% by weight of an aliphatic hydrocarbon resin with a melting point of 95° C. p1 15% by weight of an esterified rosin with a melting point of 100° C.
15% by weight of a plasticizer based on a hydrogenated rosin ester The constituents of the self-adhesive composition were dissolved in petroleum spirit in a customary mixing and stirring apparatus. The solution of self-adhesive composition was then applied in a dry-film thickness of 50 μm to an antiadhesively treated auxiliary backing and was dried.

It was also possible to mix the constituents of the self-adhesive composition in a procedure customary for the production of hotmelt pressure-sensitive adhesives, by kneading or extruding at temperatures from 140° C. up to 180° C. The composition prepared was then applied in a coating thickness of 50μm to an antiadhesively treated auxiliary backing on one of the customary applicator units for hotmelt pressure-sensitive adhesives.

To produce the adhesive tape of the invention the backing layer, an interlayer and a coat of adhesive were brought together cold with the corresponding auxiliary backing on a calender, the removal of the propylene film from the backing taking place at the same time.

The interdiffusion took place over the next 48 hours, and anchored the individual layers to one another.

Finally, the laminate was crosslinked using electron beams with a radiative dose of 60 kGy.

What is claimed is:
1. Single- or double-sidedly self-adhesively treated adhesive tape having an elastomeric backing layer, wherein a) the elastomer of the backing layer consists essentially of a styrene-butadiene copolymer blended with an anti-ageing agent and a plasticzer,
b) a self-adhesive composition is applied to one or both sides of the backing layer, and wherein, between the backing layer and the self-adhesive composition there is
c) an interlayer comprising polyphenylene ether, to prevent migration of the anti-ageing agent and plasticizer from the backing layer into the self-adhesive composition.

2. Adhesive tape according to claim 1, wherein the polyphenylene ether consists of poly(oxy-2,6-dimethyl-p-phenylene).

3. Adhesive tape according to claim 1, wherein the polyphenylene ether has been blended with minor amounts of polystyrene, polyamide, a styrene-acrylonitrile copolymer or a block copolymer based on SEBS.

4. Adhesive tape according to claim 1, wherein the interlayer has a thickness of from 5 $\mu$m to 40 $\mu$m.

5. Adhesive tape according to claim 1, wherein the interlayer is produced by extrusion with or without auxiliary backing(s).

6. Adhesive tape according to claim 1, wherein the interlayer is produced from solution on an auxiliary backing.

7. Adhesive tape according to claim 1, wherein the styrene content in the overall composition of the backing layer is at least 12% by weight.

8. Adhesive tape according to claim 1, wherein the styrene-butadiene copolymer of the backing layer is a random copolymer, prepared from a solution or by emulsion polymerization, with a styrene fraction of at least 23.5% by weight.

9. Adhesive tape according to claim 1, wherein the self-adhesive coating comprises a copolymer of methyl acrylate with 2-ethylhexyl acrylate and acrylic acid having a composition of from 20 to 40% by weight methyl acrylate, from 20 to 70% by weight 2-ethylhexyl acrylate and from 0 to 10% by weight acrylic acid.

10. A method for preventing migration of anti-ageing agent and plasticizer from a backing layer of an adhesive tape, the backing layer consisting essentially of a styrene-butadiene copolymer blended with an anti-ageing agent and a plasticizer, into an adhesive layer applied to one or both sides of the backing layer of the adhesive tape, which comprises applying an interlayer of polyphenylene ether between said backing layer and said adhesive layer.

11. The adhesive tape of claim 4, wherein said thickness of said interlayer is 8 $\mu$m.

* * * * *